United States Patent [19]

Matsuoka

[11] Patent Number: 5,372,568
[45] Date of Patent: Dec. 13, 1994

[54] MACHINE TOOL WITH AUTOMATIC TOOL CHANGER, HAVING MECHANISM FOR UTILIZING RELATIVE MOVEMENTS OF TOOL AND TOOL CHANGING GRIPPER TO CLAMP AND UNCLAMP THE TOOL

[75] Inventor: Nobuyuki Matsuoka, Ichinomiya, Japan

[73] Assignee: Brother Kogyo Kabushiki Kaisha, Nagoya, Japan

[21] Appl. No.: 76,102

[22] Filed: Jun. 14, 1993

[30] Foreign Application Priority Data

Jun. 18, 1992 [JP] Japan .................... 4-184353

[51] Int. Cl.⁵ .............................. B23Q 3/157
[52] U.S. Cl. ........................ 483/56; 409/233; 483/59
[58] Field of Search .............. 483/56, 59; 29/26 A; 409/144, 230, 233

[56] References Cited

U.S. PATENT DOCUMENTS

| | | | |
|---|---|---|---|
| 4,102,035 | 7/1978 | Voglrieder et al. | 483/56 |
| 4,196,501 | 4/1980 | Shimajiri et al. | 29/26 A |
| 4,604,012 | 8/1986 | Kawasaki et al. | 409/233 |
| 4,873,756 | 10/1989 | Yamane et al. | 29/26 A X |

FOREIGN PATENT DOCUMENTS

| | | | |
|---|---|---|---|
| 0144928 | 6/1988 | Japan | 483/56 |
| 63-267136 | 11/1988 | Japan | . |
| 2-274448 | 11/1990 | Japan | . |
| 3245939 | 11/1991 | Japan | 483/59 |

*Primary Examiner*—Z. R. Bilinsky
*Attorney, Agent, or Firm*—Oliff & Berridge

[57] ABSTRACT

A machine tool equipped with an automatic tool changing device, including a tool support having a clamping mechanism for holding a cutting tool, a tool transfer device having a tool gripper for transferring the tool to and from the tool support at a tool change position, and a device for moving the tool support and the tool transfer device in a direction perpendicular to the axis of the tool held on the tool support, the tool changing device including a mechanism for converting a first relative movement of the gripper and the tool support toward each other, into a movement of the clamping mechanism for unclamping the tool from the tool support, and converting a second relative movement of the gripper and the tool support away from each other, into a movement of the clamping mechanism for clamping the tool to the tool support, wherein the gripper has a pair of jaws shaped for engagement with the tool held on the tool support before the tool is unclamped, and for permitting completion of the first relative movement at the tool change position after the tool is unclamped.

19 Claims, 10 Drawing Sheets

MACHINE TOOL WITH AUTOMATIC TOOL CHANGER, HAVING MECHANISM FOR UTILIZING RELATIVE MOVEMENTS OF TOOL AND TOOL CHANGING GRIPPER TO CLAMP AND UNCLAMP THE TOOL

BACKGROUND OF THE INVENTION

1. Field of the Invention

The present invention relates to a machine tool equipped with an automatic tool changing device, and more particularly to such automatic tool changing device which is simple in construction.

2. Discussion of the Related Art

There is known a universal or multi-function machine tool or machining center capable of performing a variety of machining operations on workpieces and equipped with an automatic tool changing device which includes a tool magazine or tool storage drum accommodating a relatively large number of cutting tools, of either rotary type such as taps, drills, milling cutters (e.g., end milling cutters) and boring tools or non-rotary type such as lathe tools. The automatic tool changing device is adapted to return a used tool to the tool magazine, and select a new tool from the tool magazine and mount the selected new tool on a spindle of the machine, for example. Examples of machine tools equipped with such automatic tool changing device are disclosed in JP-A-63-267136 and JP-A-2-274448 (laid-open publications of unexamined Japanese Patent Applications).

The automatic tool changing device disclosed in JP-A-63-267136 utilizes vertical reciprocating movements of a spindle head to activate two cam mechanisms for exchanging tools at the tool mounting end of the machine spindle. Described more specifically, one of the cam mechanisms is used to control operations of a tool clamping mechanism for unclamping a used tool from the spindle and clamping a new tool to the spindle, and the other cam mechanism is used to control operations of a rotary tool changer arm for exchanging the tools. A crank lever provided on the spindle head is pivoted by a cam during upward and downward movements of the spindle head, and pivotal movements of the crank lever are converted into movements of the tool clamping mechanism to unclamp and clamp the tools. The rotary tool changer arm is rotatably disposed on the tool magazine, which is indexable to select a desired tool. The tool changer arm is spring-biased toward the spindle head, and the vertical movements of the spindle head cause a cam to rotate the tool changer arm for removing the used tool from the spindle and installing the new tool on the spindle.

In the automatic tool changing device disclosed in JP-A-2-274448, the spindle is moved to a predetermined tool change position at which the used and new tools are exchanged, and then returned to a machining position. The tool clamped on the spindle located at the tool change position is first gripped by one of a plurality tool grippers provided on an indexable tool magazine. Then, the tool is unclamped from the spindle by a hydraulic cylinder, and the tool magazine is advanced to remove the used tool from the spindle, rotated for indexing to bring the new tool into alignment with the spindle, and finally retracted to install the new tool on the spindle. The installed new tool is clamped by activation of the hydraulic cylinder, and the spindle is moved from the tool change position to the machining position.

Although the automatic tool changing devices described above are adapted to handle rotary cutting tools, similar mechanisms for exchanging the tools as described above are applicable to non-rotary cutting tools.

However, the automatic tool changing device disclosed in JP-A-63-267136 which uses a cam mechanism to control the tool clamping mechanism also uses another cam mechanism to control the rotary tool changer arm for exchanging the tools and is accordingly complicated in construction. On the other hand, the automatic tool changing device disclosed in JP-A-2-274448 requires an exclusive power source to activate the hydraulic cylinder for operating the tool clamping mechanism, and a detecting device for controlling the operation of the hydraulic cylinder. The use of such exclusive power source and detecting device leads to increased complexity of the tool changing device. Thus, the known automatic tool changing devices described above suffer from a relatively high cost of manufacture, and a relatively low degree of operating reliability, due to the constructional complexity.

SUMMARY OF THE INVENTION

It is therefore an object of the present invention to provide a machine tool equipped with an automatic tool changing device which is simple in construction and reliable in operation.

The above object may be achieved according to the principle of the present invention, which provides a machine tool equipped with an automatic tool changing device, including (a) a tool support device which is adapted to hold a cutting tool for performing a machining operation on a workpiece and which comprises a tool clamping mechanism for holding the cutting tool on the tool support device, (b) a tool transfer device for transferring the cutting tool to and from the tool support device, at a predetermined tool change position, the tool transfer device comprising a tool gripper having a pair of gripper jaws for gripping a chucking portion of the cutting tool, such that the axis of the tool gripped by the tool gripper is parallel with the tool held on the tool support device at least when the tool support and transfer devices are located at the tool change position, the tool gripper at the tool change position and the chucking portion of the tool held on the tool support device being aligned with each other in a direction parallel to the axis of the tool held on the tool support device, (c) a moving device for moving the tool support device and the tool transfer device toward and away from each other in a direction perpendicular to an axis of the tool held on the tool support device, and (d) a motion converting mechanism for converting a first relative movement of the tool gripper of the tool transfer device and the tool support device toward each other near the tool change position, into a movement of the tool clamping mechanism for unclamping the tool from the tool support device, and converting a second relative movement of the tool gripper and the tool support device away from each other near the tool change position, into a movement of the tool clamping mechanism for clamping the tool to the tool support device, and wherein the pair of gripper jaws of the tool gripper are shaped so as to engage the gripping portion of the tool held on the tool support device before the tool is unclamped by the tool clamping mechanism, and to permit the first relative movement to be completed at the predetermined tool change position after the tool is unclamped.

In the machine tool equipped with the automatic tool changing device constructed according to the present invention as described above, the tool is automatically unclamped and clamped with respect to the tool support device such as a machine spindle, when the tool support device and the tool transfer device are moved toward each other and away from each other.

Described in detail, when the tool support device carrying the cutting tool clamped thereto and the tool transfer device having the tool gripper are moved toward each other in the direction perpendicular to the longitudinal direction of the tool held on the tool support device, this relative movement is converted by the motion converting mechanism into the movement of the tool clamping mechanism for unclamping the tool from the tool support device. To avoid removal or displacement of the unclamped tool, the gripper jaws of the tool gripper of the tool transfer device engage the tool during the relative movement of the tool and the tool gripper toward each other, before the unclamping of the tool is initiated.

The gripper jaws of the tool gripper are shaped so as to permit the mutually engaging tool and tool gripper to be further moved toward each other until they are located at the predetermined tool change position (where the distance between the tool support device and the tool transfer device is the shortest). Thus, the tool is unclamped only after the gripper jaws have engaged the tool and before the tool change position is reached. Since the tool gripped by the tool gripper of the tool transfer device has been unclamped from the tool support device before the tool change position is reached, the tool can be removed from the tool support device by a subsequent action of the tool transfer device in the tool change position, and replaced by another tool which is mounted on the tool support device by a further action of the tool transfer device. After the exchange of the tools is completed, the tool transfer device and the tool support device are moved away from each other. This movement causes the newly mounted tool to be clamped to the tool support device before the new tool is released from the tool gripper during the movement.

The automatic tool changing device of the present machine tool utilizes the movements of the tool support device and the tool transfer device toward and away from each other, which are converted by the motion converting mechanism into the movements of the tool clamping mechanism to unclamp and clamp the tool with respect to the tool support device. The gripper jaws of the tool gripper continuously engage the used tool supported on the tool support device, during a terminal portion of the movement of the tool and the tool gripper toward each other before the tool is unclamped, and also engage the new tool until that tool is clamped to the tool support device during an initial portion of the movement of the tool and the tool gripper away from each other. This arrangement prevents removal or displacement of the tools from or with respect to the tool support device after the unclamping of the used tool or before the clamping of the new tool.

The automatic tool changing device is simpler in construction and more economical to manufacture, than the known automatic tool changing device using two cam mechanisms one for the rotary tool changer arm as disclosed in the above-identified laid-open publication JP-A-63-267136, and the known automatic tool changing device using an exclusive power source for the hydraulic cylinder for actuating the tool clamping mechanism as disclosed in the above-identified JP-A-2-274448.

It is noted that the term "cutting tool" used above should be broadly interpreted to comprehend not only a cutting tool alone or per se, but also a combination of a cutting tool and a suitable tool holder or adaptor used to mount the tool on the tool support device such as the spindle of a drilling or milling machine or a machining center.

The tool clamping mechanism may use a draw bar for unclamping the tool from the tool support device when the draw bar is advanced in a direction toward the cutting tool, and clamping the cutting tool to the tool support device when the draw bar is retracted in a direction away from the cutting tool. In this case, the motion converting mechanism converts the first and second relative movements of the tool gripper and the tool support device into advancing and retracting movements of the draw bar, respectively.

In one form of the above arrangement, the tool support device is a spindle head of the machine tool, which comprises a housing body, and a main spindle which is rotatably supported by the housing body and which holds the cutting tool at one end thereof. The main spindle has a center bore in which the draw bar is axially slidably movable, and the tool clamping mechanism further includes a biasing member for biasing the draw bar toward a fully retracted position thereof.

In the above form of the invention, the motion converting mechanism may include: an unclamping lever supported by the housing body pivotally about an axis which is spaced apart from an axis of the main spindle and which is perpendicular to the axis of the main spindle; a linear-rotary conversion mechanism for converting the first and second relative movements of the tool gripper and the spindle head into pivotal movements of the unclamping lever; and a rotary-linear conversion mechanism for converting the pivotal movements of the unclamping lever into the advancing and retracting movements of the draw bar.

The linear-rotary conversion mechanism indicated above may include a cam and a cam follower, the cam being provided on one of the unclamping lever and a separate member whose distance to the housing body of the spindle head changes during the first and second movements of the tool gripper and the spindle head. In place of the cam and cam follower, the linear-rotary conversion mechanism may use a pivotable lever which is pivotally connected at one of opposite ends thereof to the separate member indicated above, and at the other end to the unclamping lever, such that the pivotable lever is inclined with respect to the axis of the main spindle, and so that the unclamping lever is pivoted about the free end so as to move the draw bar during the relative movements of the tool gripper and the spindle head.

The separate member indicated above may be a portion of a body of the machine tool, and the spindle head may be moved by the moving device relative to the body of the machine tool. In this case, the above-indicated portion of the machine tool body may be a column which extends upright and which slidably supports the spindle head. In this arrangement, the moving device is operated to move the spindle head on the column.

The rotary-linear conversion mechanism may comprise an abutting member which extends in a radially inward direction of the main spindle from one of the unclamping lever and the draw bar, through a hole formed through the cylindrical wall of the main spindle, so that the abutting member abuts on the other of the unclamping lever and the draw bar when the unclamping lever is pivoted. This arrangement permits the unclamping lever act on the draw bar, at an axially middle portion of the main spindle, and therefore makes it possible to dispose the bearings for the main spindle such that the outermost bearings are spaced apart from each other by a considerable distance in the axial direction of the main spindle. The same arrangement also makes it possible to position the unclamping lever within the length of the main spindle.

The abutting member may be a member which extends from the draw bar in the radially outward direction of the draw bar, so that the member is abuttable on the unclamping lever. Alternatively, the abutting member may extend from the unclamping lever in the radially inward direction of the draw bar, so that the member is abuttable on a suitable portion of the draw bar or a member fixed to the draw bar.

In the above arrangement using the abutting member extending through the hole formed through the cylindrical wall of the main spindle, the unclamping lever may be pivotally supported by the housing body of the spindle head, at one of longitudinally opposite ends thereof, and has at the other end one of a cam and a cam follower which are engageable with each other, the other of the cam and the cam follower being provided on a separate member whose distance to the housing body of the spindle head changes during the first and second movements of the tool gripper and the spindle head. In this case, the unclamping lever further has a through-hole formed through an intermediate portion thereof between the longitudinally opposite ends, and the main spindle extends through this through-hole, with a radial clearance therebetween. The abutting member may be a pair of extensions such as pins fixed to the draw bar, which are abuttable on respective parts of the intermediate portion of the unclamping lever which are opposed to each other via the through-hole in the diametric direction of the draw bar. This arrangement permits the unclamping lever to engage the draw bar via the two extensions at an axially middle portion of the main spindle, and is effective to protect the unclamping lever against a moment about an axis parallel to the longitudinal direction of the unclamping lever, thereby making it possible to reduce the size of the components such as the unclamping lever and the member or members pivotally supporting the unclamping lever.

In place of the above arrangement in which the abutting member extends from the draw bar or the unclamping lever through the hole formed through the cylindrical wall of the main spindle, the rotary-linear conversion mechanism may use an arrangement in which the rear end portion of the draw bar extends through the rear open end of the main spindle in the axial direction, so that the unclamping lever per se or a roller attached to the unclamping lever is abuttable on the rear end portion or rear end face of the draw bar or a member attached to the rear end portion of the draw bar.

In the above form of the present invention wherein the tool clamping mechanism uses a draw bar slidably received in the center bore of the main spindle of the spindle head, the motion converting mechanism may be adapted to include: a slave cylinder comprising a first piston coaxially with the draw bar and axially slidably and fluid-tightly received in the center bore, and a closure block fixedly received in the center bore, the closure block cooperating the main spindle and the first piston to define a fluid chamber; a master cylinder comprising a cylinder housing provided on one of the housing body of the main spindle and a separate member whose distance to the housing changes during the first and second movements of the tool gripper and the spindle head, the master cylinder further comprising a second piston which is axially slidably and fluid-tightly received in the housing and which is moved by the other of the housing body and the separate member, to apply a fluid pressure to the fluid chamber; and a connector for connecting the fluid chamber of the slave cylinder and the master cylinder while permitting rotation of the main spindle.

In a further form of this invention, the pair of gripper jaws are pivotable to effect opening and closing actions on the cutting tool, and include a pair of gripping portions for positioning and gripping the tool at the chucking portion such that the tool is immovable in a radial and an axial direction thereof, and a pair of latch portions extending substantially parallel to each other from the gripping portions, respectively, toward free ends of the gripper jaws. The latch portions are engageable with the chucking portion of the tool such that the tool is movable in the radial direction but immovable in the axial direction. Each of the gripping portions may have an arcuate inner edge having a curvature corresponding to an outer circumference of the chucking portion of the tool.

The pair of latch portions indicated above may consist of a pair of straight portions having respective straight inner edges opposed to each other, and a pair of guide portions extending from the straight portions toward free ends of the gripper jaws. The guide portions have respective inner edges which are inclined with respect to the straight inner edges of the straight portions such that a distance between the inner edges of the guide portions increases in a direction toward the free ends.

Alternatively, the latch portions may consist of a pair of cam portions having respective curved inner edges formed such that a distance between the curved inner edges increases in a direction toward free ends of the gripper jaws, at a rate which increases in the direction toward the free ends.

The pair of gripper jaws may include a pair of pivotable members pivotable on a plane so as to effect opening and closing actions on the chucking portion of the tool, and a pair of rotatable members rotatably attached to the pair of pivotable members, respectively. The rotatable members are rotatable about respective axes which are perpendicular to the plane in which the pivotable members are pivoted.

BRIEF DESCRIPTION OF THE DRAWINGS

The above and optional objects, features and advantages of the present invention will better understood by reading the following detailed description of presently preferred embodiments of the invention, when considered in connection with the accompanying drawings, in which.

DETAILED DESCRIPTION OF THE PREFERRED EMBODIMENTS

Figure 1:
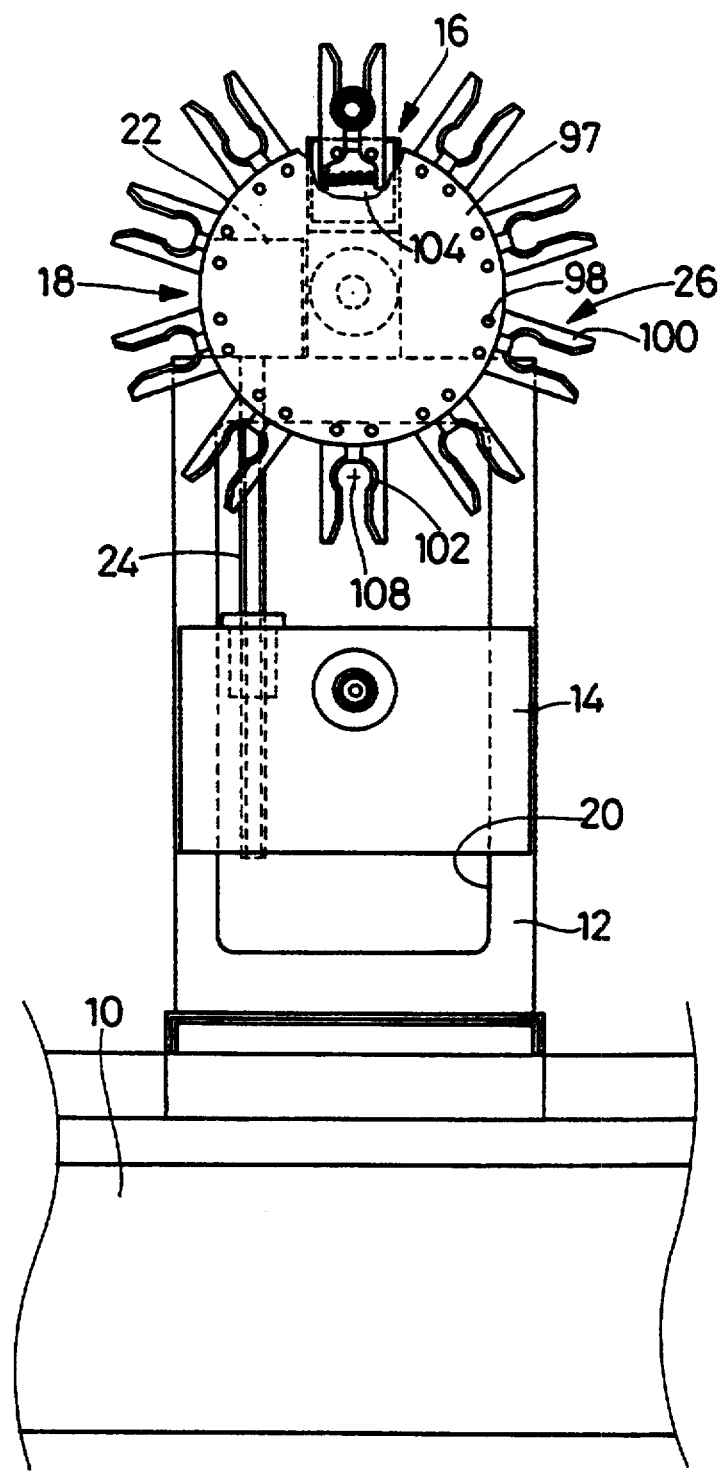
FIG. 1 is a front elevational view showing one embodiment of the present invention in the form of a drilling machine equipped with an automatic tool changing device.
Figure 2:
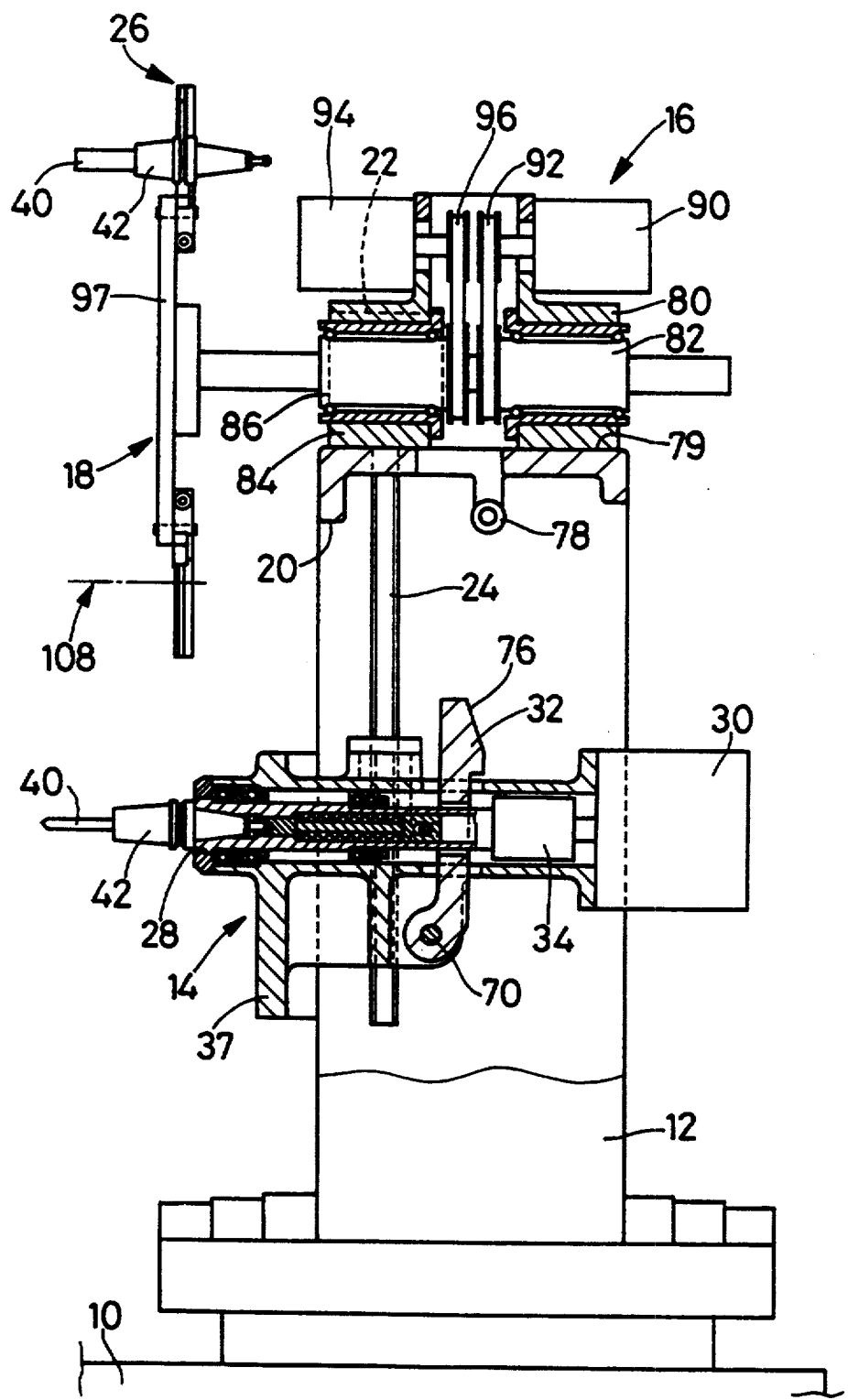
FIG. 2 is a side elevational view in cross section of an upper part of the drilling machine of FIG. 1.

Referring first to the front and side elevational views of FIGS. 1 and 2, a machine tool in the form of a drilling machine has a base 10, a column 12 fixed to the base 10, a spindle head 14 slidably mounted on the column 12, a tool magazine actuator 16 secured to the column 12, and a tool magazine 18 which is rotatably supported by the actuator 16 and which has a plurality of tool grippers 26. The spindle head 14 is almost entirely received within an opening 20 formed in the column 12 so as to extend in the vertical direction. The spindle head 14 is fed in the vertical direction by a servo motor 22 mounted atop the column 12, via a ballscrew 24 connected to the motor 22.

The tool magazine 18 is capable of accommodating a plurality of rotary cutting tools 40 (drilling tools, tapping tools, etc.) held in respective tool holders 42, such that the tool holders 42 are gripped by the respective tool grippers 26. As most clearly shown in FIG. 1, the tool grippers 26 are equally spaced apart from each other in the rotating direction of the tool magazine 18. As described below, the tool magazine 18 is rotated by the actuator 16 to select a desired one of the cutting tools 40, and is moved by the actuator 16 in a direction parallel to the axis of rotation.

Figure 3:
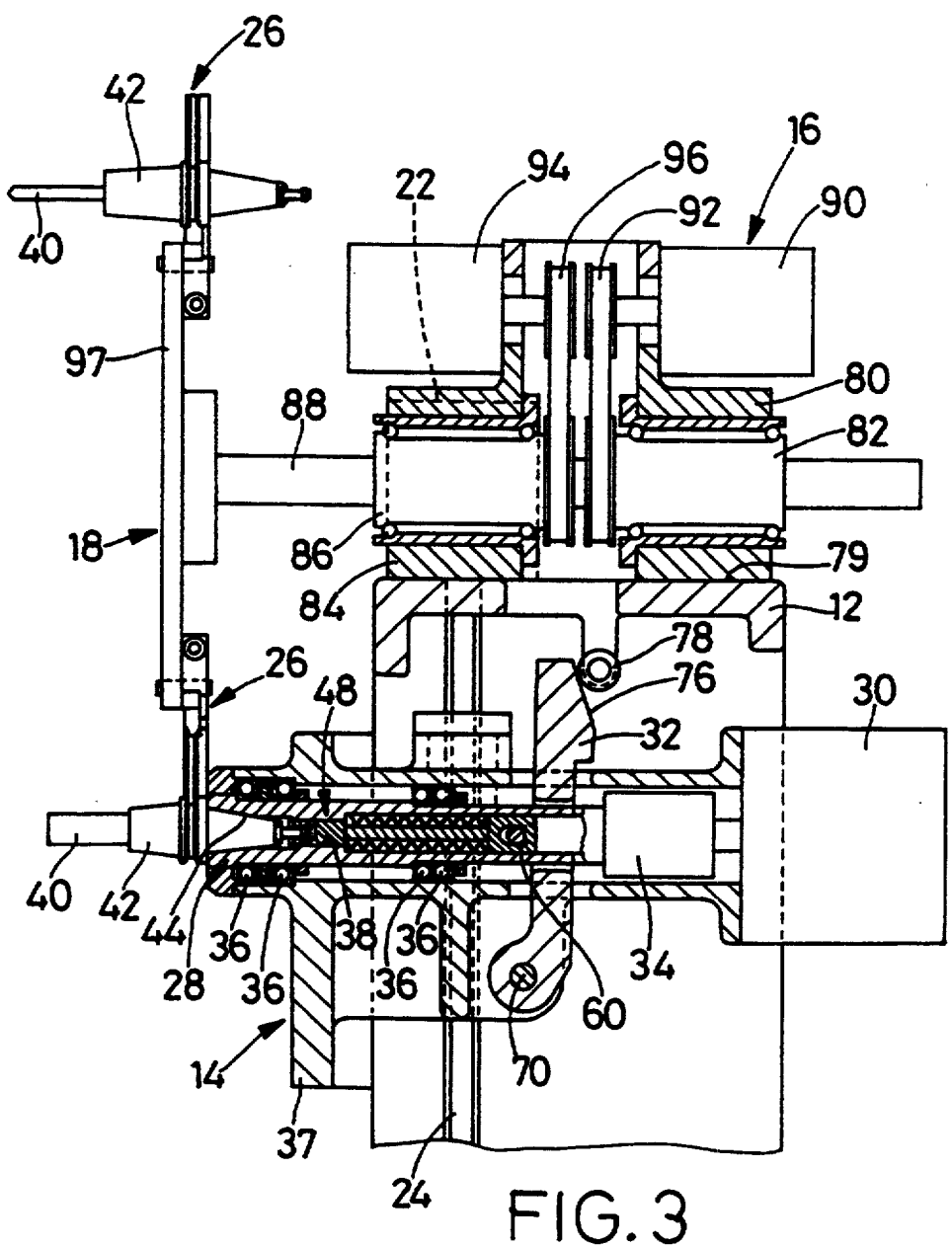
FIG. 3 is a side elevational view in cross section of an upper part of the automatic tool changing device.

Referring further to FIGS. 3 and 4, the construction of the spindle head 14, the tool magazine actuator 16 and the tool magazine 18 will be described in detail.

The spindle head 14 is provided with a tool support device in the form of a main spindle 28, a spindle drive motor 30, and an unclamping lever 32. The main spindle 28 is connected to the motor 30 through a coupling 34.

Figure 4A:
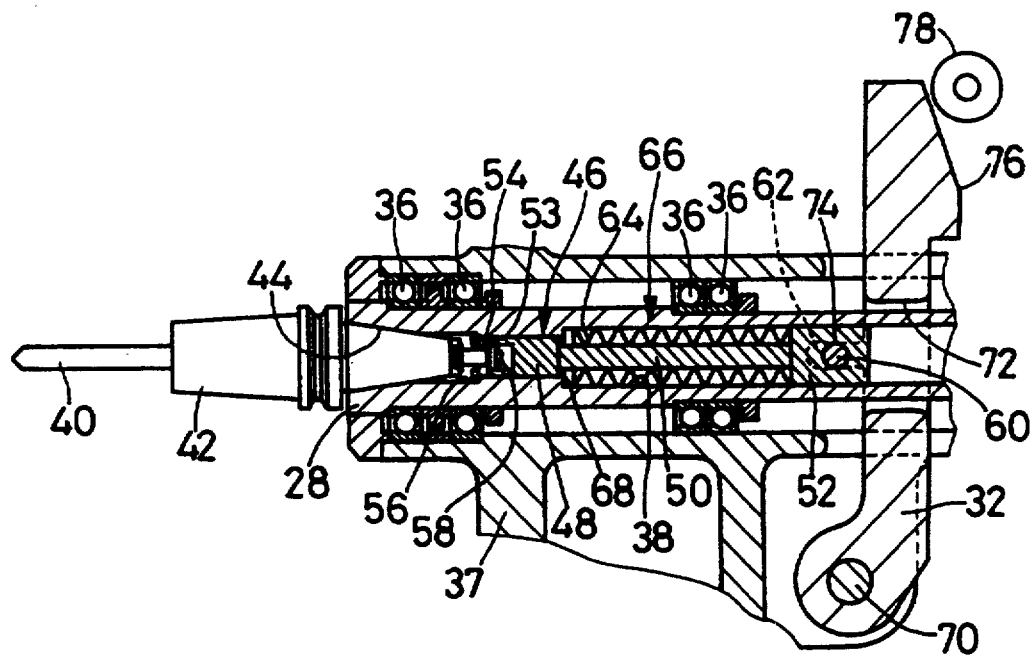
FIG. 4(A) is a fragmentary elevational view in cross section depicting one operating position of an unclamping lever used to unclamp a tool holder mounted on a spindle of the machine.

As shown in FIG. 4(A), the main spindle 28 is rotatably supported by a housing body 37 of the spindle head 14, via a plurality of bearings 36. The spindle 28 has a center bore 38 formed therethrough in the axial direction. The front end portion of the bore 38 is tapered and provides a mounting hole 44 for receiving a tapered shank of the tool holder 42 which carries a cutting tool 40 to be used for a machining operation on the workpiece. The remaining portion of the bore 38 consists of holes having different diameters, in which is received a draw bar 46 in coaxial relation with the main spindle 28. The draw bar 46, which is axially slidable with respect to the bore 38, consists of a front clamping portion 48 adjacent to the tapered mounting hole 44, an intermediate rod portion 50, and a rear piston portion 52.

The clamping portion 48 has a recess open axially at its front end face. The cylindrical wall defining the diameter of this recess has a plurality of radial holes 53 formed in the radial direction of the draw bar 46. The radial holes 53 are arranged in an equally spaced apart relation with each other in the circumferential direction of the clamping portion 48. Each radial hole 53 accommodates a steel ball 54 such that the ball 54 is movable in the radial direction of the clamping portion 48. The radial hole 53 is shaped and dimensioned to prevent the steel ball 54 from moving out of the hole 53. As the draw bar 48 is retracted in the direction away from the tapered mounting hole 44, the balls 54 are pushed inwardly of the radial holes 44, by a cam surface 56 which partially defines a portion of the stepped bore 38 near the mounting hole 44, whereby the balls 54 engage a pull stud 58 provided at the rear end of the tool holder 42, as most clearly shown in FIG. 7. When the draw bar 46 is placed in the fully retracted position, the tapered shank of the tool holder 42 is forced against the mounting hole 44, and is thus clamped to the main spindle 28. When the draw bar 46 is placed in the fully advanced position, on the other hand, the steel balls 54 are movable radially outwardly of the radial holes 44, whereby when the tool holder 42 is pulled out of the mounting hole 44, the balls 54 are forced by the pull stud 58, radially outwardly of the radial holes 44, and permit the pull stud 58 to be released from the balls 54. Thus, the tool holder 42 is unclamped from the spindle 28 when the draw bar 46 is located at its fully advanced position.

Figure 5:
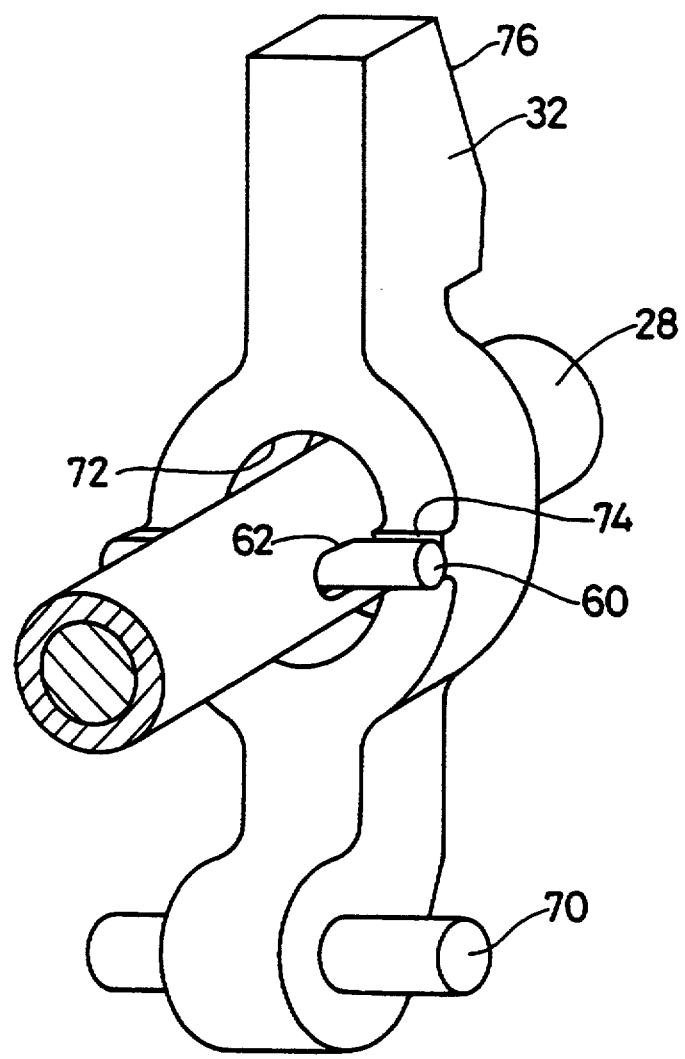
FIG. 5 is a perspective view illustrating the unclamping lever and a pin fixed to a draw bar disposed within the spindle.

The piston portion 52 provided at the rear end of the draw bar 46 has an abutting member in the form of a pin 60 fixedly extending therethrough in the radial direction, and also through elongate holes 62 formed through the cylindrical wall of the spindle 28, as shown in FIG. 5. The elongate holes 62 are elongated in the axial direction of the spindle 28. A series array 66 of belleville springs (coned disk springs) 64 is disposed around the intermediate rod portion 50 between the front clamping portion 48 and the rear piston portion 52. The spring array 66 consisting of the belleville springs 64 is held in pressing contact at one end with a shoulder 68 of the stepped bore 38, and at the other end with the front end of the piston portion 52, so that the draw bar 46 is biased toward its fully retracted position in which the tool holder 42 is normally clamped to the spindle 28.

Figure 4B:
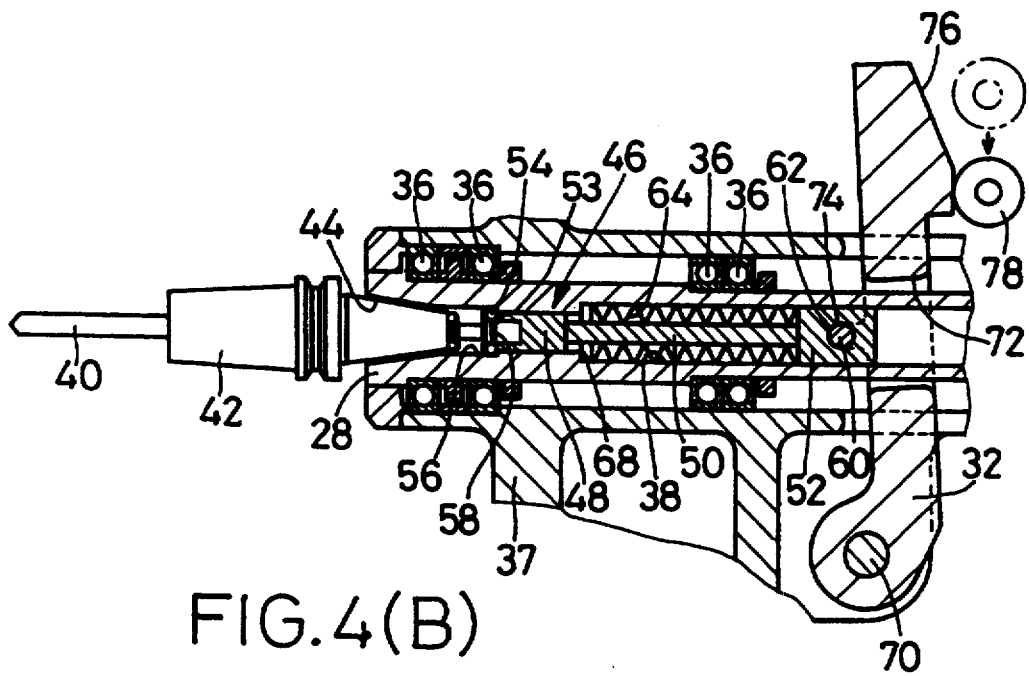
FIG. 4(B) is a fragmentary elevational view in cross section depicting another operating position of the unclamping lever of FIG. 4(A)

The unclamping lever 32 is supported by the housing body 37, pivotally about a pivot pin 70 fixed to the body 37. The pin 70 is spaced from the axis of the main spindle 28, and extends in the horizontal direction parallel to the direction of extension of the pin 60, that is, perpendicular to the axis of the main spindle 28. As shown in FIG. 5, the unclamping lever 32 has a through-hole 72 formed in a middle portion thereof, which permits the spindle 28 to extend therethrough, with a radial clearance therebetween. The lever 32 also has contact portions 74 formed for abutting contact with the opposite ends portions of the pin 60 secured to the piston portion 52 of the draw bar 46. The lever 32 further has a cam surface 76 on its side remote from the contact portions 74. As shown in FIGS. 4(A) and 4(B), a rotatable cam follower 78 is provided on the column 12, so that the cam surface 76 of the unclamping lever 32 comes into engagement with the cam follower 78 when the spindle head 14 is moved up and located at a position a short distance below a predetermined tool change position 108 indicated in FIG. 2. With the unclamping lever 76 pushed at the cam surface 76 by the cam follower 78, the lever 76 is pivoted counterclockwise to the position of FIG. 4(B), whereby the draw bar 46 is eventually moved to its fully advanced position to unclamp the tool holder 42 from the spindle 28.

The tool magazine actuator 16 is constructed as shown in FIG. 3. More specifically, the tool magazine actuator 16 includes a feeding nut 82 and a spline member 86, which are rotatably received within respective housings 80 and 84 mounted on a top surface 79 of the column 12. The nut 82 and the spline member 86 are coaxial with each other and operatively connected to a magazine shaft 88 which supports the tool magazine 18, such that the magazine 18 and the shaft 88 are rotated as a unit. The magazine shaft 88 has an externally thread portion in the form of a ballscrew engaging the feeding nut 82, and a splined portion engaging the spline member 86.

A shaft feed motor 90 is secured to the housing 80 and is connected to the feeding nut 82 by a timing belt 92. To the housing 84, there is secured a shaft rotating motor 94 connected to the spline member 86 by a timing belt 96. To move the magazine shaft 88 (tool magazine 18) in the axial direction without rotation thereof, only the shaft feed motor 90 is activated to rotate the feeding nut 82. To rotate the shaft 88 (tool magazine 18) without an axial movement thereof, the shaft feed motor 90 and the shaft rotating motor 90 are synchronously operated to rotate both the nut 82 and the spline member 86. The rotation of the nut 82 in synchronization with the spline member 86 permits the shaft 88 to remain in the same axial position, even though the shaft 88 is rotated by the spline member 86.

Figure 6:
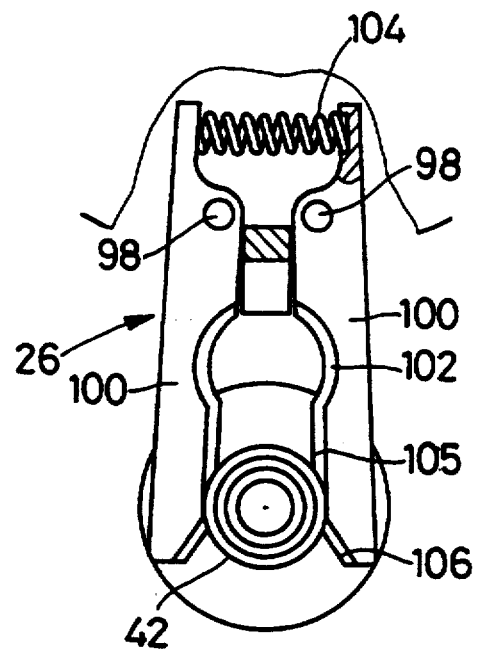
FIG. 6 is a front elevational view of a tool gripper used in the automatic tool changing device shown in FIG. 1.
Figure 7:
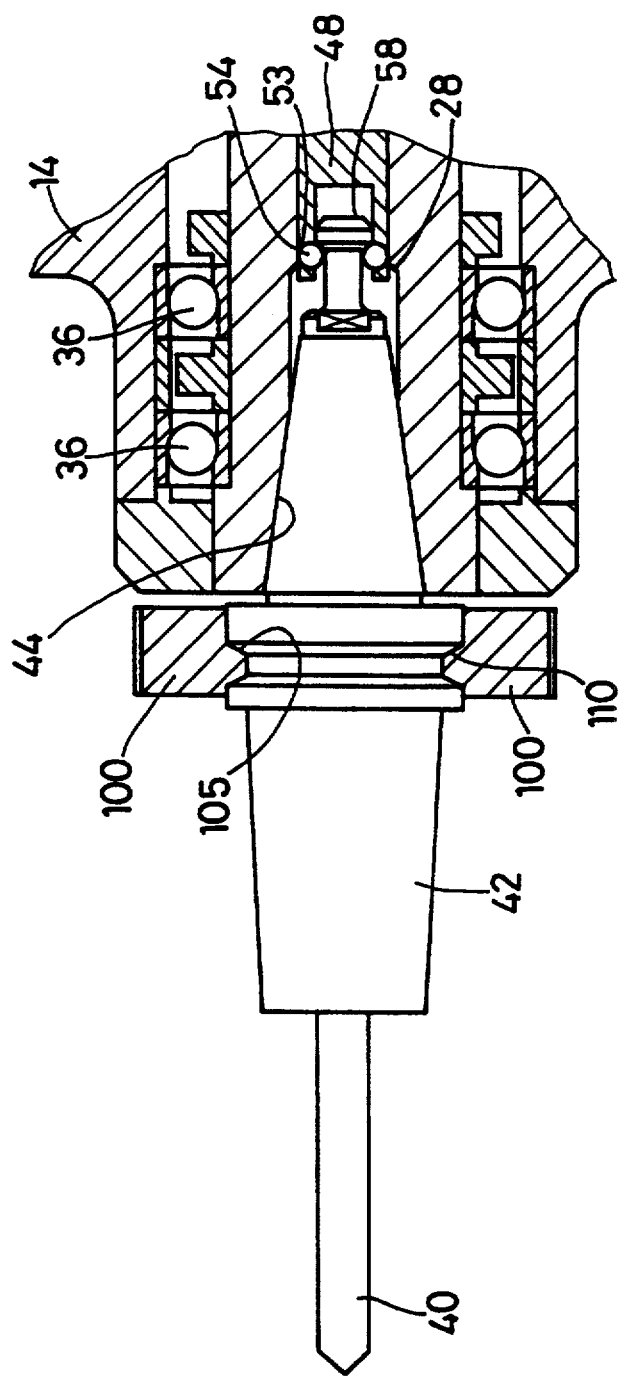
FIG. 7 is a plan view in cross section showing the tool gripper gripping a tool holder mounted on the machine spindle.

The tool magazine 18 has a body in the form of a disk 97, at which the magazine 18 is attached to the front end of the magazine shaft 88. The disk 97 carries ten tool grippers 26 fixed at its outer periphery such that the tool grippers 26 are arranged at a predetermined angular spacing along the circumference of the disk 97. As shown in FIG. 6, each tool gripper 26 includes a pair of pivotable members in the form of a pair of gripper jaws 100 each pivotable about respective support pins 98. The pivotable jaws 100 are opened and closed in a vertical plane. Each gripper jaw 100 has a gripping portion 102 located relatively near the pin 98. The gripping portion 102 has an arcuate inner edge having a curvature following the outer circumferential surface of the tool holder 42. The two gripper jaws 100 are biased by a coil spring 104 so that the two gripping portions 102 cooperate to position and grip the tool holder 42. Each gripper jaw 100 further has a straight portion 105 contiguous to the arcuate inner edge of the gripping portion 102, and a guide portion 106 contiguous to the straight portion 105. The straight portion 105 has a straight inner edge and a constant width as measured perpendicularly to the longitudinal direction of the jaw 100. The guide portion 106 is provided at one end of the jaw 100 opposite to the end at which the coil spring 104 is provided. The guide portion 106 has an inner edge inclined with respect to the straight inner edge of the straight portion 105, so that the width of the guide portion 106 increases in the direction from the straight portion 105 toward the extreme end of the guide portion 106. As shown in FIG. 7, the gripping, straight and guide portions 102, 105 and 106 of the gripper jaw 100 have a trapezoidal cross sectional shape similar to a profile of a V-groove 110 formed in the outer surface of a chucking portion of the tool holder 42.

In the present embodiment, the tool magazine 18 functions as a device for accommodating or storing the cutting tools 40 (with the tool holders 42), and cooperates with the actuator 16 to function as a tool transfer device for transferring the tools 40 to and from the main spindle 28.

It will be understood that the automatic tool changing device includes: the tool magazine actuator 16; the tool magazine 18 having the tool grippers 26; a tool clamping mechanism having the draw bar 46, balls 54, cam surface 56, and spring array 66; a motion converting mechanism having the unclamping lever 32, pin 60 and cam follower 78; and a moving device including the servo motor 22 and ballscrew 24 for moving the spindle head 14.

There will next be described an operation of the automatic tool changing device provided on the drilling machine.

After a machining operation on a workpiece using a cutting tool 40 held by the tool holder 42 mounted on the spindle 28 is finished, the rotation of the spindle 28 is stopped, and the spindle head 14 is moved up toward the predetermined tool change position 108, by means of the servo motor 22 and ballscrew 24. Before the spindle head 14 reaches the tool change position 108, the tool holder 42 mounted on the spindle 28 comes into engagement with the guide portions 106 of the gripper jaws 100 of the lowermost tool gripper 26 placed in the tool change position 108, namely, the tool gripper 26 right above the axis of the spindle 28. In this condition, the tool gripper 26 is aligned with the V-groove 110 of the tool holder 42 mounted on the spindle 28. As the tool holder 42 is moved up with the spindle head 14 a further distance, the gripper jaws 100 are opened by the tool holder 42, against a biasing force of the coil spring 104, and the V-groove 110 of the tool holder 42 then engages the straight portions 105 of the gripper jaws 100, as shown in FIGS. 6 and 7. In this condition, the tool holder 42 is prevented from axially moving relative to the spindle 28, and is still kept clamped to the spindle 28 under the biasing action of the belleville springs 64, because the cam surface 76 of the unclamping lever 32 provided on the spindle head 14 is still spaced apart from the cam follower 78 provided on the column 12, with the contact portions 74 of the lever 32 being spaced apart from the pin 60, as shown in FIG. 4(A).

As the spindle head 14 is further moved up, the cam surface 76 of the unclamping lever 32 is brought into abutting contact with the cam follower 78, and the lever 32 is pivoted counterclockwise about the support shaft 70 toward its unclamping position, as shown in FIG. 4(B). This pivotal movement of the unclamping lever 32 causes the contact portions 74 to abut on the pin 60, resulting in an advancing movement of the draw bar 46 against the biasing force of the belleville springs 64. As a result, the tool holder 42 is unclamped from the spindle 28. In this condition, however, the tool holder 42 is prevented from moving in the axial direction away from the mounting hole 44 of the spindle 28, because the V-groove 110 of the tool holder 42 engages the straight portions 105 of the gripper jaws 100 of the tool gripper 26. The unclamped tool holder 42 is moved a further distance with the spindle 28, until the spindle 28 reaches the predetermined tool change position 108, at which the upward movement of the spindle head 14 is stopped. In this tool change position 108, the tool holder 42 is securely gripped by the gripping portions 102 of the gripper jaws 100, and the straight portions 105 function as latch portions for preventing the tool holder 42 from moving down from the gripping portions 102 and from moving in the axial direction relative to the jaws 100. The tool magazine actuator 16 is then activated to effect an automatic tool changing operation as described below.

Initially, the feeding nut 82 is rotated to advance the tool magazine 18, for thereby removing the tool holder 42 from the mounting hole 44 of the spindle 28. Then, the feeding nut 82 and the spline member 86 are synchronously rotated by an amount corresponding to an angle of rotation of the tool magazine 18 necessary to bring the next tool 40 to the tool change position 108. That is, the tool magazine 18 is rotated until the tool holder 42 having the tool 40 to be used next is aligned with the axis of the spindle 28 located in the tool change position 108. Subsequently, the feeding nut 82 is rotated in the reverse direction to retract the tool magazine 18 toward the actuator 16, so that the tool holder 42 having the next tool 40 is mounted on the spindle 28. Then, the spindle head 14 is moved down away from the tool magazine 18, for performing a machining operation using the new tool 40 now mounted on the spindle 28.

During an initial period of the downward movement of the tool holder 42 with the spindle head 14, the V-groove 110 of the tool holder 42 on the spindle 28 continues to engage the straight portions 105 of the gripper jaws 100 of the tool gripper 26, thereby maintaining the tool holder 42 in the predetermined axial position relative to the spindle 28 (mounting hole 44). As the spindle head 14 is further lowered, the cam surface 76 of the unclamping lever 32 is disengaged from the cam follower 78 on the column 12, whereby the lever 32 is pivoted clockwise, allowing the draw bar 46 to return to the clamping position under the biasing action of the belleville springs 64. Thus, the tool holder 42 is clamped to the spindle 28 by the biasing force of the belleville springs 64. With a further downward movement of the tool holder 42 with the spindle 28, the tool holder 42 is released from the gripper jaws 100 of the tool gripper 26 in the tool change position 108. Now, a next machining operation with the new cutting tool 40 can be started.

It will be understood from the above description that the vertical movements of the spindle 28 (spindle head 14) to and from the tool change position 108 cause or give rise to automatic unclamping and clamping of the tool holder 42 to and from the spindle 28, automatic transfer of the unclamped tool holder 42 to the tool gripper 26 of the tool magazine 18, and automatic release of the new tool holder 42 from the tool gripper 26. These automatic tool changing actions are performed sequentially with high reliability, in a relatively short length of time, during which the spindle head 14 is moved to and from the tool change position 108. Further, since the cam mechanism (76, 78) to clamp and unclamp the tool holder 42 with respect to the spindle 28 is activated by the movements of the spindle head 14, the present automatic tool changing device does not require an exclusive power source (e.g., hydraulic power source) for clamping and unclamping the tool holder 42, and proximity sensors or similar detecting means for controlling such exclusive power source. Thus, the present automatic tool changing device is simple in construction, economical to manufacture and reliable in operation.

In the above first embodiment of FIGS. 1-7, each gripper jaw 100 of the tool gripper 26 has the straight and guide portions 105, 106 in addition to the gripping portion 102. However, the gripper jaws 100 may be modified as desired, provided the modified gripper jaws function to prevent an axial movement of the tool holder 42 relative to the spindle 28 during upward movement of the spindle head 14 to the tool change position 108. Examples of modifications of the tool gripper are illustrated in FIGS. 8 and 9.

Figure 8:
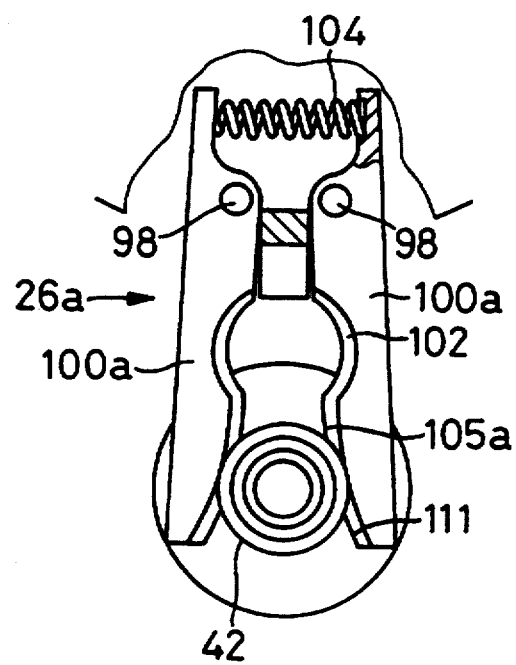
FIG. 8 is a view corresponding to that of FIG. 6, showing a tool gripper alternative to that of FIG. 6, which is used in a second embodiment of this invention.

In a second embodiment of this invention, the tool magazine 18 uses tool grippers 26a as shown in FIG. 8. Each tool gripper 26a has a pair of gripper jaws 100a, each having the arcuate gripping portion 102 as provided on the tool gripper 26, and a cam portion 105a having a curved inner edge 111 contiguous to the V-shaped inner edge. The curved inner edges 111 of the two gripper jaws 100a are shaped such that a distance between the two inner edges 111 increases in the direction from the gripping portion 102a toward the free ends of the jaws 100a, at a rate which increases in the same direction. The cam portion 105a performs the same function as the straight portion 105 (latch portion) and the guide portion 106 of the tool gripper 26 used in the first embodiment.

Figure 9:
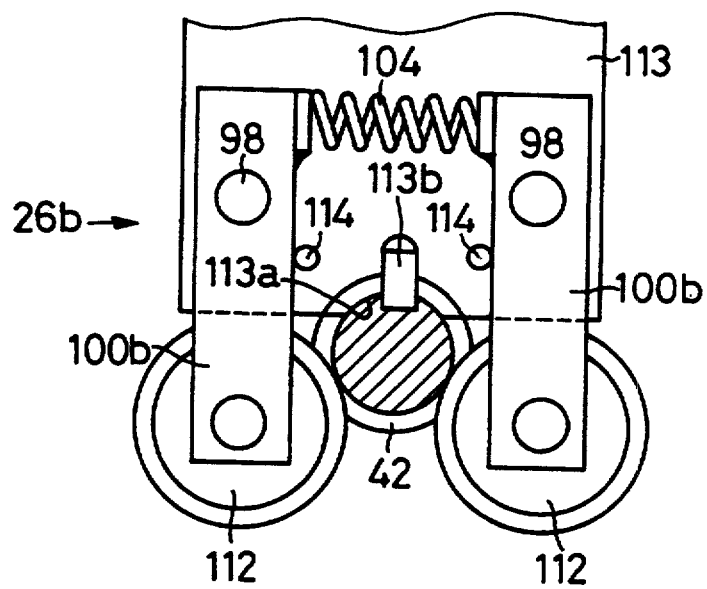
FIG. 9 is a front elevational view of another alternative form of the tool gripper used in a third embodiment of the invention.

In a third embodiment of the invention, the tool magazine 18 uses tool grippers 26b as shown in FIG. 9, Each tool gripper 26b has a pair of gripper jaws 100b, each carrying a rotatable member in the form of a roller 112 at its end removed from the end at which the jaw 100b is biased by the spring 104. The pins 98 pivotally supporting the gripper jaws 100b extend from a plate 113, which has two stopper pins 114 for determining the angular positions of the two gripper jaws 100b in which the tool holder 42 is finally gripped by the jaws 100b. When the tool holder 42 is gripped by the tool gripper 26b, the tool holder 42 forces the rollers 112 rotatably supported by the gripper jaws 100b, whereby the gripper jaws 100b are pivoted about the respective pins 98 such that the rollers 112 in rolling contact with the V-groove 110 of the tool holder 42 are moved away from each other, permitting the tool holder 42 to be moved into the tool gripper 26b until the tool holder 42 engages an arcuate recess 113a formed in the plate 113, whereat the pivotal movements of the gripper jaws 100b are stopped by the respective stopper pins 114. The plate 113 has a key 113b fixed thereto for engagement with a groove formed in the tool holder 42, for circumferential positioning of the tool holder 42. However, the key 113b may be fixed to the tool holder 42. In this embodiment, the rollers 112 and the arcuate recess 113a function as tool gripping portions. The rollers 112 also function as latch portions like the straight and guide portions 105, 106. Each roller 112 has an annular ridge formed on the outer circumferential surface, which ridge is shaped following the profile of the V-groove 110 of the tool holder 42. The surface defining the arcuate recess 113a also has a ridge corresponding to the V-groove 110.

In the above three embodiments, the unclamping lever 32 having the contact portions 74 and cam surface 76, the pin 60 fixed to the draw bar 46, and the cam follower 78 provided on the column 12 cooperate to provide the motion converting mechanism for converting the vertical movements of the spindle 28 toward and away from the tool magazine 18 (tool transfer device having the tool grippers 26, 26a, 26b), into advancing and retracting movements of the draw bar 46 to unclamp and clamp the tool holder 42 (tool 40) with respect to the spindle 28.

Figure 10:
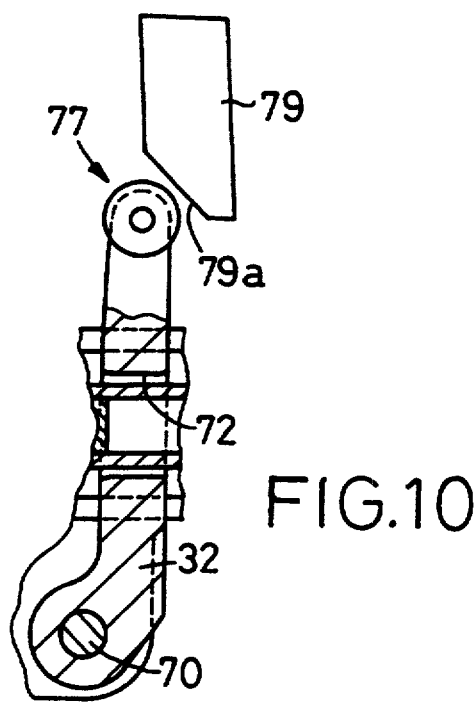
FIG. 10 is a fragmentary elevational view corresponding to that of FIG. 4(A), showing a fourth embodiment of the invention.

Although the cam surface 76 and the cam follower 78 are provided on the unclamping lever 32 and the column 12, respectively, a reverse arrangement is shown in FIG. 10, which shows a fourth embodiment of the present invention, wherein a cam follower 77 is fixed to the free end of the unclamping lever 32 while a cam member 79 having a cam surface 79a is fixed to the column 12.

Figure 11:
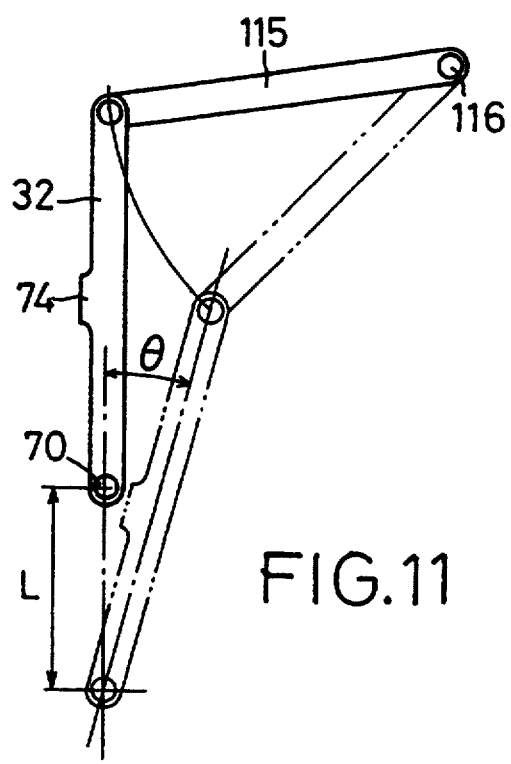
FIG. 11 is a view showing a motion converting mechanism used in a fifth embodiment of the invention, in place of the mechanism used in the embodiment of FIGS. 1-7.

In a fifth embodiment of the present invention, however, the combination of the cam surface 76 and the cam follower 78 which constitutes a principal part of the motion converting mechanism in the above embodiments is replaced by an arrangement as shown in FIG. 11, in which the unclamping lever 32 having the contact portions 74 is pivotally connected to at its upper or free end (remote from the pin 70) to one end of a pivotable lever 115, which in turn is pivotally connected at the other end to a pin 116 fixed on the machine column 12. When the spindle head 14 is located at a position lower than the tool change position 108 (FIG. 2), the two levers 32, 115 are inclined relative to the axis of the main spindle 28, and relative to each other, as indicated by two-dot chain line in FIG. 10. According to this arrangement, an upward movement of the spindle head 14 by a distance L up to the tool change position 108 causes a pivotal movement of the unclamping lever 32 by an angle θ. A predetermined terminal fraction of the pivoting angle θ of the unclamping lever 32 is used to move the draw bar 46 in the advancing direction, with the contact portions 74 of the lever 32 abutting on the pin 60 fixed to the draw bar 46 as described above. This embodiment is preferred where the spindle head 14 is fixed in its vertical position during a machining operation, or where the vertical stroke of the spindle head 14 used for a machining operation is relatively short.

Figure 12:
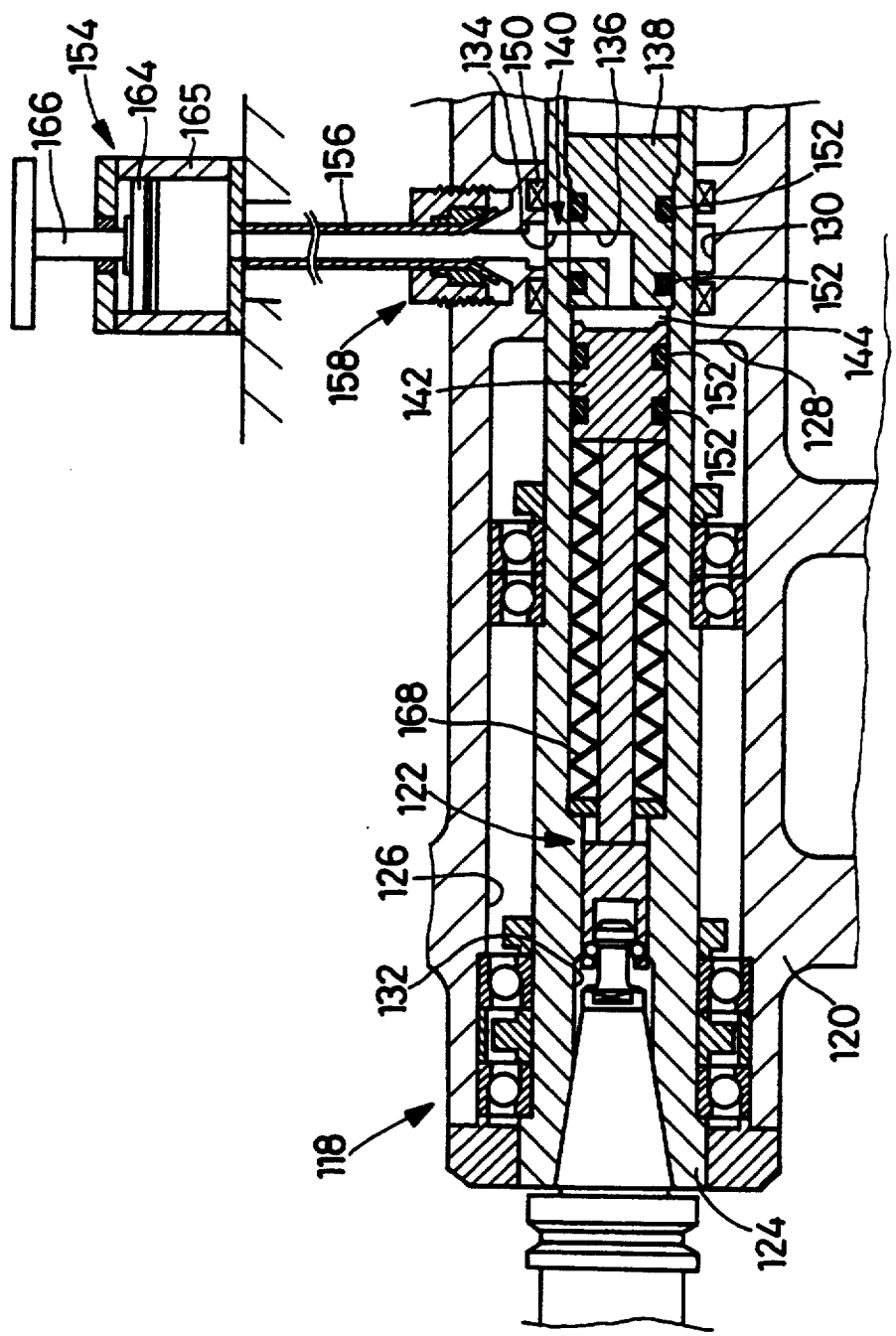
FIG. 12 is a fragmentary elevational view in cross section showing a sixth embodiment of the present invention which uses another alternative form of the motion converting mechanism.

Referring next to FIG. 12, there will be described a sixth embodiment of this invention using a further modified form of the motion converting mechanism, which does not use a cam mechanism to clamp and unclamp the tool holder 42.

In the fifth embodiment of FIG. 12, a spindle head 118 has a housing body 120 which rotatably supports a main spindle 124 incorporating a draw bar 122. The housing body 124 has an axial through-hole 126 through which the spindle 124 extends, and an annular protrusion 128 which projects radially inwardly into the through-hole 126. The annular protrusion 128 has a circumferential groove 130 formed in an inner circumferential surface thereof which slidably contacts the rotating spindle 124. The spindle 124 has a spindle bore 132 in which the draw bar 122 is axially slidably and fluid-tightly received, and a radial hole 134 formed through its cylindrical wall. The radial hole 134 is aligned with the circumferential groove 130 of the annular protrusion 128. The spindle bore 132 also accommodates a closure block 138 fixed therein so that the block 138 cooperates with the spindle 124 and a rear piston portion 142 of the draw bar 122, to define a fluid chamber 144. The block 138 has a passage 136 which communicates with the fluid chamber 144, and with the circumferential groove 130 through the radial hole 134. The passage 136, radial hole 134 and groove 130 provide a fluid passageway 140 for feeding a pressurized fluid to the fluid chamber 144 to advance the draw bar 122 and thereby unclamp the tool holder 42 from the spindle 124. Sealing members 150 are provided between the outer circumferential surface of the spindle 124 and the annular protrusion 128, while sealing O-rings 152 are provided between the inner circumferential surface of the spindle 124 and the block 138 and the piston portion 142 of the draw bar 122, for securing fluid-tightness between the spindle 124 and the piston portion 142, and between the spindle 124 and the block 138.

The spindle head 118 is provided with an unclamping master cylinder 154 connected to the fluid passageway 140 through a conduit 156 and a joint 158. The master cylinder 154 has a piston 164 axially slidably and fluid-tightly received in a housing 165. The master cylinder is moved with the spindle head 118 and adapted to deliver a pressurized fluid for thereby increasing the fluid pressure in the fluid chamber 144 of the slave cylinder when the piston 164 is lowered. Described in detail, when the spindle head 118 is moved up toward the tool change position as indicated at 108 in FIG. 2, a piston rod 166 fixed to the piston 164 of the master cylinder 154 comes into abutting contact with an abutment provided at an appropriate position on the column 12, whereby the piston 164 is lowered to its unclamping position, to feed the pressurized fluid into the fluid chamber 144 through the conduit 156 and the passageway 140. As a result, the draw bar 122 is advanced against the biasing force of belleville springs (coned disk springs) 168 disposed around the bar 122.

The main spindle 124, the piston portion 142 of the draw bar 122, and the block 138 cooperate to constitute a slave cylinder having the fluid chamber 144 communicating with the fluid passageway 140. The fluid passageway 140, conduit 156 and joint 158 provide a connector for connecting the master cylinder 154 and the fluid chamber 144, while permitting the rotation of the spindle 124.

When the spindle head 118 is moved down away from the tool change position, the piston 164 is permitted to return to the clamping position in which the fluid pressure in the fluid chamber 144 is low enough to allow the draw bar 122 to return to its clamping position under the biasing force of the belleville springs 168.

While the present invention has been described above in its presently preferred embodiments with a certain degree of particularities, it is to be understood that the present invention is not limited to the details of the illustrated embodiments, but may be embodied with various changes, modifications and improvements such as those described below, which may occur to those skilled in the art.

Although the automatic tool changing device as applied to a drilling machine using the rotary cutting tools 40 has been described for illustrative purpose only, the principle of the present invention is equally applicable to other types of machine tools such as turning machines or lathes which use non-rotary cutting tools. Where the automatic tool changing device of the present invention is applied to a turning machine, for example, a tool magazine accommodating non-rotary cutting tools is disposed at one end of the machine bed, for instance, and an automatic tool changing operation between the tool magazine and a tool support device in the form of a non-indexable tool post or an indexable tool turret is effected by utilizing the movements of the tool post or tool turret to and from a predetermined tool change position near the tool magazine. In this case, at least one tool clamping mechanism is provided on the tool post or tool turret and is adapted so that the movements of the tool post or turret cause automatic clamping and unclamping of the tool holders on the tool post or turret.

In the illustrated embodiments, exchanges of the tool holders 42 (tools 40) are effected between the spindle 28, 124 and the tool magazine 18. Namely, the tool holder 42 accommodating the used tool 40 is returned from the spindle 28, 124 directly to the tool magazine 18, and the tool holder 42 accommodating the new tool 40 is transferred from the tool magazine 18 directly to the spindle 28, 124. However, the automatic tool changing device may use a tool transfer device in the form of a tool changing arm or arms having a tool gripper or grippers, which is disposed between the spindle and the tool magazine, so that the tool holder is first transferred to the tool changing arm before the tool holder is mounted on the spindle or returned to the tool magazine. For instance, a tool changing arm has two tool grippers at its opposite ends, so that when the used and new tools are exchanged, the tool holder mounted on the spindle is gripped by one of the two tool grippers, while one of the tool holders which has been selected from the tool magazine by suitable indexing of the tool magazine is gripped by the other tool gripper.

In the illustrated embodiments, the spindle head 14 is vertically moved relative to the tool magazine 18 fixed on the column 12 when the tool changing operation is effected. However, the tool magazine 18 and the tool magazine actuator 16 may be designed to be vertically movable relative to the spindle head 14 located at a predetermined tool change position selected along the operating stroke of the spindle head, so that the movements of the tool magazine 18 cause automatic unclamping and clamping of the tool holder 42 and automatic transfer of the tool holder 42 between the tool gripper 26 and the main spindle 28.

It will be further understood that the present invention may be embodied with various other changes, modifications and improvements, which may occur to those skilled in the art, in the light of the foregoing teachings.

What is claimed is:

1. A machine tool equipped with an automatic tool changing device, comprising:

a tool support device which is adapted to hold a cutting tool for performing a machining operation on a workpiece and which comprises a tool clamping mechanism for holding said cutting tool on said tool support device;

a tool transfer device for transferring said cutting tool to and from said tool support device at a predetermined tool change position, said tool transfer device comprising a tool gripper having a pair of gripper jaws for gripping a chucking portion of said cutting tool such that an axis of the tool gripped by said tool gripper is parallel with the axis of the tool held on said tool support device at least when said tool support and transfer devices are located at said tool change position;

said tool gripper in said tool change position and said chucking portion of the tool held on said tool support device being aligned with each other in a direction parallel to said axis of the tool gripped by said tool gripper;

a moving device for moving said tool support device and said tool transfer device toward and away from each other in a direction perpendicular to said axis of the tool held on said tool support device;

a motion converting mechanism for converting a first relative movement of said tool gripper of said tool transfer device and said tool support device toward each other near said tool change position, into a movement of said tool clamping mechanism for unclamping said tool from said tool support device, and converting a second relative movement of said tool gripper and said tool support device away from each other near said tool change position, into a movement of said tool clamping mechanism for clamping said tool to said tool support device; and said pair of gripper jaws of said tool gripper being shaped so as to engage said chucking portion of said tool held on said tool support device before said tool is unclamped by said tool clamping mechanism, for thereby preventing said tool from axially moving relative to said tool support device after said tool is unclamped, and so as to permit said first relative movement to be completed at said predetermined tool change position after the tool is unclamped.

2. A machine tool according to claim 1, wherein said tool clamping mechanism includes a draw bar for unclamping said tool from said tool support device when said draw bar is advanced in a direction toward said cutting tool, and clamping said cutting tool to said tool support device when said draw bar is retracted in a direction away from said cutting tool, and wherein said motion converting mechanism converts said first and second relative movements of said tool gripper and said tool support device into advancing and retracting movements of said draw bar, respectively.

3. A machine tool according to claim 2, wherein said tool support device is a spindle head which comprises a housing body, and a main spindle which is rotatably supported by said housing body and which holds said cutting tool at one end thereof, said main spindle having a center bore in which said draw bar is axially slidably movable, said tool clamping mechanism further including a biasing member for biasing said draw bar toward a fully retracted position thereof, and wherein said motion converting mechanism includes:

an unclamping lever supported by said housing body pivotally about an axis which is spaced apart from an axis of said main spindle and which is perpendicular to the axis of said main spindle;

a linear-rotary conversion mechanism for converting said first and second relative movements of said tool gripper and said spindle head into pivotal movements of said unclamping lever; and a rotary-linear conversion mechanism for converting said pivotal movements of said unclamping lever into said advancing and retracting movements of said draw bar.

4. A machine tool according to claim 3, wherein said linear-rotary conversion mechanism includes a cam and a cam follower, said cam being provided on one of said unclamping lever and a separate member whose distance to said housing body of said spindle head changes during said first and second movements of said tool gripper and said spindle head.

5. A machine tool according to claim 3, wherein said separate member consists of a portion of a body of said machine tool, and said moving device moves said spindle head relative to said body of the machine tool.

6. A machine tool according to claim 5, wherein said portion of said body of the machine tool consists of a column which extends upright, and said moving device moves said spindle head along said column.

7. A machine tool according to claim 3, wherein said main spindle has a hole formed through a cylindrical wall thereof, and said rotary-linear conversion mechanism comprises an abutting member which extends in a radially inward direction of said main spindle from one of said unclamping lever and said draw bar, through said hole of said main spindle, said abutting member being abuttable on the other of said unclamping lever and said draw bar.

8. A machine tool according to claim 7, wherein said unclamping lever is pivotally supported by said housing body of said spindle head, at one of longitudinally opposite ends thereof, and has at the other of said longitudinally opposite ends one of a cam and a cam follower which are engageable with each other, the other of said cam and said cam follower being provided on a separate member whose distance to said housing body of said spindle head changes during said first and second movements of said tool gripper and said spindle head, said unclamping lever further having a through-hole formed through an intermediate portion thereof between said longitudinally opposite ends thereof, said main spindle extending through said through-hole, with a radial clearance therebetween, said abutting member consisting of a pair of extensions disposed between said draw bar and parts of said intermediate portion of said unclamping lever which are opposed to each other via said through-hole in a diametric direction of said draw bar.

9. A machine tool according to claim 2, wherein said tool support device is a spindle head which comprises a housing body, and a main spindle which is rotatably supported by said housing body and which holds said cutting tool at one end thereof, said main spindle having a center bore in which said draw bar is axially slidably movable, said tool clamping mechanism further including a biasing member for biasing said draw bar toward a fully retracted position thereof, and wherein said motion converting mechanism includes:

a slave cylinder comprising a first piston coaxially with said draw bar and axially slidably and fluid-tightly received in said center bore, and a closure block fixedly received in said center bore, said closure block cooperating said main spindle and said first piston to define a fluid chamber;

a master cylinder comprising a cylinder housing provided on one of said housing body of said main spindle and a separate member whose distance to said housing changes during said first and second movements of said tool gripper and said spindle head, said master cylinder further comprising a second piston which is axially slidably and fluid-tightly received in said housing and which is moved by the other of said housing body and said separate member, to apply a fluid pressure to said fluid chamber; and a connector for connecting said fluid chamber of said slave cylinder and said master cylinder while permitting rotation of said main spindle.

10. A machine tool according to claim 1, wherein said pair of gripper jaws are pivotable to effect opening and closing actions on said cutting tool, and include a pair of gripping portions for positioning and gripping said tool at said chucking portion such that said tool is immovable in a radial and an axial direction thereof, and a pair of latch portions extending substantially parallel to each other from said gripping portions, respectively, toward free ends of said gripper jaws, said pair of latch portions being engageable with said chucking portion of said tool such that said tool is movable in the radial direction but immovable in the axial direction.

11. A machine tool according to claim 10, wherein each of said pair of gripping portions has an arcuate inner edge having a curvature corresponding to an outer circumference of said chucking portion of said tool.

12. A machine tool according to claim 10, wherein said pair of latch portions consists of a pair of straight portions having respective straight inner edges opposed to each other, and a pair of guide portions extending from said straight portions toward free ends of said gripper jaws, said guide portions having respective inner edges which are inclined with respect to said straight inner edges of said straight portions such that a distance between said inner edges of said guide portions increases in a direction toward said free ends.

13. A machine tool according to claim 10, wherein said pair of latch portions consists of a pair of cam portions having respective curved inner edges formed such that a distance between said curved inner edges increases in a direction toward free ends of said gripper jaws, at a rate which increases in said direction toward said free ends.

14. A machine tool according to claim 1, wherein said pair of gripper jaws includes a pair of pivotable members pivotable on a plane so as to effect opening and closing actions on said chucking portion of said tool, and a pair of rotatable member rotatably attached to said pair of pivotable members, respectively, said rotatable members being rotatable about respective axes which are perpendicular to said plane in which said pivotable members are pivoted.

15. A machine tool according to claim 1, wherein said tool transfer device comprises:

a shaft supported by a body of the machine tool, axially movably and rotatably about an axis thereof parallel to an axis of a main spindle of the machine tool;

a rotatable member attached to said shaft and having a plurality of tool grippers which are arranged at a predetermined angular interval along a circle having a center on said axis of said rotatable member;

an axial feed device for moving said shaft in an axial direction thereof; and a rotating device for rotating said shaft for indexing said rotatable member to bring one of said plurality of tool grippers to a predetermined position.

16. A machine tool according to claim 15, wherein said rotating device includes a splined portion of said shaft, and a spline member axially immovably and rotatably supported by said body of the machine tool and engaging said splined portion of said shaft such that said shaft and said spline member are rotatable with each other and axially movable relative to each other, said rotating device further including a first drive source for rotating said spline member, and wherein said axial feed device includes an externally threaded portion of said shaft, an internally threaded nut axially immovably and rotatably supported by said body of the machine tool and engaging said externally threaded portion of said shaft, and a second drive device for rotating said nut in synchronization with rotation of said spline member when said spline member is rotated by said first drive device, and for rotating said nut alone when said spline member is not rotated.

17. A machine tool according to claim 15, wherein said rotating member of said tool transfer device has at least three tool grippers for holding respective cutting tools, and constitutes a tool magazine for transferring the cutting tools from said tool support device to one of said at least three tool grippers, and transferring one of said cutting tools held by said at least three tools grippers to said tool support device.

18. A machine tool according to claim 15 wherein said tool clamping mechanism includes a draw bar for unclamping said tool from said tool support device when said draw bar is advanced in a direction toward said cutting tool, and clamping said cutting tool to said tool support device when said draw bar is retracted in a direction away from said cutting tool, and wherein said motion converting mechanism converts said first and second relative movements of said tool gripper of said tool transfer device and said tool support device, into advancing and retracting movements of said draw bar, respectively.

19. A machine tool according to claim 18, wherein said tool support device is a spindle head which comprises a housing body, and said main spindle which is rotatably supported by said housing body and which holds said cutting tool at one end thereof, said main spindle having a center bore in which said draw bar is axially slidably movable, said tool clamping mechanism further including a biasing member for biasing said draw bar toward a fully retracted position thereof, and wherein said moving device move moves said spindle head relative to said tool transfer device.

* * * * *